(12) United States Patent
Omshehe et al.

(10) Patent No.: US 7,647,407 B2
(45) Date of Patent: Jan. 12, 2010

(54) METHOD AND SYSTEM FOR ADMINISTERING A CONCURRENT USER LICENSING AGREEMENT ON A MANUFACTURING/PROCESS CONTROL INFORMATION PORTAL SERVER

(75) Inventors: Barry Omshehe, Mission Viejo, CA (US); Janie West, Trabuco Canyon, CA (US); Paul W. Forney, Laguna Hills, CA (US)

(73) Assignee: Invensys Systems, Inc., Foxboro, MA (US)

( * ) Notice: Subject to any disclaimer, the term of this patent is extended or adjusted under 35 U.S.C. 154(b) by 1676 days.

(21) Appl. No.: 09/954,509

(22) Filed: Sep. 14, 2001

(65) Prior Publication Data

US 2002/0069172 A1 Jun. 6, 2002

Related U.S. Application Data

(60) Provisional application No. 60/232,733, filed on Sep. 15, 2000.

(51) Int. Cl.
*G06F 15/16* (2006.01)
(52) U.S. Cl. .................. 709/227; 709/219
(58) Field of Classification Search .......... 709/229, 709/225, 203, 219, 227
See application file for complete search history.

(56) References Cited

U.S. PATENT DOCUMENTS

| | | | | |
|---|---|---|---|---|
| 4,937,863 A * | 6/1990 | Robert et al. | ............... | 710/200 |
| 5,390,297 A * | 2/1995 | Barber et al. | ............... | 713/201 |
| 5,533,174 A * | 7/1996 | Flowers et al. | ............. | 358/1.15 |
| 5,579,222 A * | 11/1996 | Bains et al. | ................. | 717/167 |
| 5,768,133 A | 6/1998 | Chen et al. | | |
| 5,845,065 A * | 12/1998 | Conte et al. | ................... | 726/31 |
| 5,940,504 A * | 8/1999 | Griswold | ..................... | 705/59 |
| 6,029,145 A * | 2/2000 | Barritz et al. | ................. | 705/34 |
| 6,049,789 A * | 4/2000 | Frison et al. | .................. | 705/59 |
| 6,056,786 A * | 5/2000 | Rivera et al. | ................ | 717/168 |
| 6,073,055 A | 6/2000 | Jahn et al. | | |
| 6,073,123 A * | 6/2000 | Staley | ......................... | 705/58 |

(Continued)

OTHER PUBLICATIONS

International Search Report in corresponding PCT Application No. PCT/US01/28956, dated Nov. 21, 2001.

(Continued)

*Primary Examiner*—William C Vaughn, Jr.
*Assistant Examiner*—Kristie D Shingles
(74) *Attorney, Agent, or Firm*—Leydig, Voit & Mayer Ltd.

(57) ABSTRACT

Disclosed is a server that provides session-persistent concurrent licenses for resources accessed by clients. In one embodiment, rather than requiring a license when the server is initially accessed, a license is not requested until a client seeks access to a licensed resource. In one implementation, scripts for Web pages associated with licensed resources include requests for licenses from a license management facility. Certain resources conditionally request a license based upon the origin of the access request: the license request may be bypassed for access requests from "pre-licensed" applications. Session-based licensing allows equitable assessment of compensation to a service provider for use of the services. The server includes many resources, some of which require a license for access while others do not. The services of premium value are the only ones for which customers are expected to obtain/claim a license.

20 Claims, 10 Drawing Sheets

U.S. PATENT DOCUMENTS

| | | | | |
|---|---|---|---|---|
| 6,163,844 | A * | 12/2000 | Duncan et al. | 726/3 |
| 6,167,383 | A | 12/2000 | Henson | |
| 6,173,446 | B1 * | 1/2001 | Khan et al. | 717/127 |
| 6,411,941 | B1 * | 6/2002 | Mullor et al. | 705/59 |
| 6,412,077 | B1 * | 6/2002 | Roden et al. | 714/4 |
| 6,453,305 | B1 * | 9/2002 | Glassman et al. | 705/59 |
| 6,484,257 | B1 * | 11/2002 | Ellis | 713/153 |
| 6,574,612 | B1 * | 6/2003 | Baratti et al. | 705/59 |
| 6,735,699 | B1 * | 5/2004 | Sasaki et al. | 713/200 |
| 6,842,896 | B1 * | 1/2005 | Redding et al. | 717/172 |
| 6,857,067 | B2 * | 2/2005 | Edelman | 713/155 |
| 6,968,384 | B1 * | 11/2005 | Redding et al. | 709/229 |

OTHER PUBLICATIONS

International Search Report in corresponding PCT Application No. PCT/US01/29310, dated Dec. 26, 2001.

Hansen et al. "A Performance Tracking Methodology and Decision Support Mode," IEEE, 2000, pp. 256-262.

* cited by examiner

FIG. 3

| | |
|---|---|
| 130 | LicInfo (multi-element string) |
| 132 | ActiveLicenses (string) |
| 134 | TotalLicenses (string) |
| 136 | License Log (table) |

FIG. 4

| | |
|---|---|
| 140 | ID |
| 142 | TimeStart |
| 144 | TimeStop |
| 146 | EventId |
| 148 | SessionId |
| 150 | UserId |
| 152 | ActiveCount |
| 154 | MaxCount |

FIG. 5

| | |
|---|---|
| 200 | GetLicense |
| 202 | GetLicenseEx |
| 204 | ReleaseLicense |
| 206 | ReleaseLicenseEx |
| 208 | GetLicInfo |
| 210 | GetErrorMsg |
| 212 | CryptSetRegKey |
| 214 | CryptGetRegKey |

METHOD AND SYSTEM FOR ADMINISTERING A CONCURRENT USER LICENSING AGREEMENT ON A MANUFACTURING/PROCESS CONTROL INFORMATION PORTAL SERVER

CROSS REFERENCE TO RELATED APPLICATION

This application claims priority of Forney et al. U.S. provisional application Ser. No. 60/232,733, filed on Sep. 15, 2000, entitled "Extensible Manufacturing Portal Server," the contents of which are expressly incorporated herein by reference in their entirety including the contents and teachings of any references contained therein.

FIELD OF THE INVENTION

The present invention generally relates to the field of computerized process control networks. More particularly, the present invention relates to methods for enforcing concurrent user access limits based upon an enterprise license definition. The present invention concerns enforcing such limits with regard to users that concurrently access manufacturing/process control information via a network (e.g., Internet/intranet) portal server.

BACKGROUND OF THE INVENTION

Significant advances in industrial process control technology have vastly improved all aspects of factory and plant operation. Before the introduction of today's modern industrial process control systems, industrial processes were operated/controlled by humans and rudimentary mechanical controls. As a consequence, the complexity and degree of control over a process was limited by the speed with which one or more people could ascertain a present status of various process state variables, compare the current status to a desired operating level, calculate a corrective action (if needed), and implement a change to a control point to affect a change to a state variable.

Improvements to process control technology have enabled vastly larger and more complex industrial processes to be controlled via programmed control processors. Control processors execute control programs that read process status variables and execute control algorithms based upon the status variable data and desired set point information to render output values for the control points in industrial processes. Such control processors and programs support a substantially self-running industrial process (once set points are established).

Notwithstanding the ability of industrial processes to operate under the control of programmed process controllers at previously established set points without intervention, supervisory control and monitoring of control processors and their associated processes are desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

Various data input/output servers, including for example data access servers, facilitate placing process control data (both reading and writing) within reach of a variety of higher-level monitor/control client applications. During the course of operation, process controllers generate status and control information concerning associated processes. The controllers' process status and control information is stored within process control databases and/or distributed to a number of locations within the process control network. Other process information is generated/stored within field devices (e.g., intelligent transmitters) having digital data communication capabilities. The process information is retrieved from the process control databases and field devices by data access servers for further processing/use by the process control system. For example, the data access servers provide the retrieved information to a variety of client applications providing high-level control and monitoring (both human and computerized) services.

In systems containing data input/output servers, the high-level control and monitoring applications rely upon the proper operation of the servers to provide the data upon which such applications rely for decision-making. The information includes real-time process variable values, alarms, etc. Data input/output servers are implemented in a number of forms. In some systems, a single data access server operates upon a single node on a computer network from which higher level supervisory control is implemented. In other systems, multiple data access servers are located upon a local area network, and the multiple data access servers are accessed by supervisory-level applications running on other nodes on a local control network. In yet other systems, access to process control information/resources is achieved via temporary sessions established via a wide area network link. One particular example is data access provided via an Internet/intranet portal server.

A portal site is an Internet/intranet site that provides access to a variety of information from potentially many sources. Portal sites, referred to as vertical portals, are sometimes designed to provide access to a particular type of information. Portal servers handle user traffic at portal sites and provide user access over the Internet/intranet to the variety of data sources exposed by the portal site. Such users generally access the portal site via remote computers executing general browser software such as the well known MICROSOFT INTERNET EXPLORER or NETSCAPE NAVIGATOR. Through the browsers the users access the data sources exposed by the portal site/server.

Portal servers provide a wide variety of services. One example of such a service is "content accessibility" that facilitates connectivity to information sources and/or content providers. Content includes: online documents, libraries, databases, and government. Such content can be located over a wide geographic area, but is connected via a network structure (e.g., the Internet). Another example of a portal service is a search engine that enables users to locate particular information within a vast amount of available content. A portal server often maintains an index to enhance performance of searches. Another portal service is visualization of available services (e.g., displaying various features available to users). A second aspect to visualization is displaying documents and information retrieved at the request of a user. Yet another portal server function is providing access to users from many parts of the world via the World Wide Web. Such access includes both domestic and foreign users. A last example of a portal function is support for personalization. A portal is used by many different people for many purposes. Portal servers store user profile information to enhance user experiences.

An advantage of a portal server approach to accessing process control information/resources is the ability of users to gain access from virtually any location in the world. Such access enables specialists (both human and programmed) to obtain access to and provide supervisory services without having to be physically present on the manufacturing/industrial plant. Such accessibility can save an enterprise considerable time and costs and avoid travel delays. Wide area network access of the type supported by a portal server also enables centralized, coordinated, and highly integrated control of an enterprise spread over a relatively wide geographic area. Notwithstanding the significant benefits of providing Web access to a process control network, significant challenges are faced with regard to regulating access to the process control network information and resources as well as to properly charging customers for their use of such portal services.

SUMMARY OF THE INVENTION

The present invention offers a new way to monitor and regulate access by users to manufacturing/process control portal services and fairly charging customers for their use of premium resources accessed via the portals. A method and system are presented that facilitate administering a session-based concurrent user licensing agreement on a manufacturing/process control information portal such that a single logon during a session persists across multiple distinct resources to which access is provided to a registered user via the plant information portal site. After a portal server receives an access request to a resource for which a license is required, the portal server invokes a license manager. Such invocation is triggered by an embedded code, such as an executable script instruct. The license manager is associated with restricted resources accessed via the portal.

After being invoked, the license manager confirms that an identified source associated with the request does not possess a concurrent user license. The license manager also confirms that a concurrent license is available to assign to the identified source. If such a license is both needed by the requesting identified entity and all the concurrent licenses under a currently enforced maximum concurrent user license have not been claimed, the license manager allows the requesting identified entry to claim a concurrent user license. The concurrent user license persists by adding the identified source to a list of concurrent users to which a concurrent user license is assigned.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 3 summarizes a set of data structures maintained by a concurrent session-persistent license management system;

FIG. 4 summarizes a set of fields maintained within a license log for a concurrent user license management system;

FIG. 5 identifies a set of function calls supported by a concurrent user session-based license management system embodying the present invention;

DETAILED DESCRIPTION OF AN ILLUSTRATIVE EMBODIMENT

Figure 1:
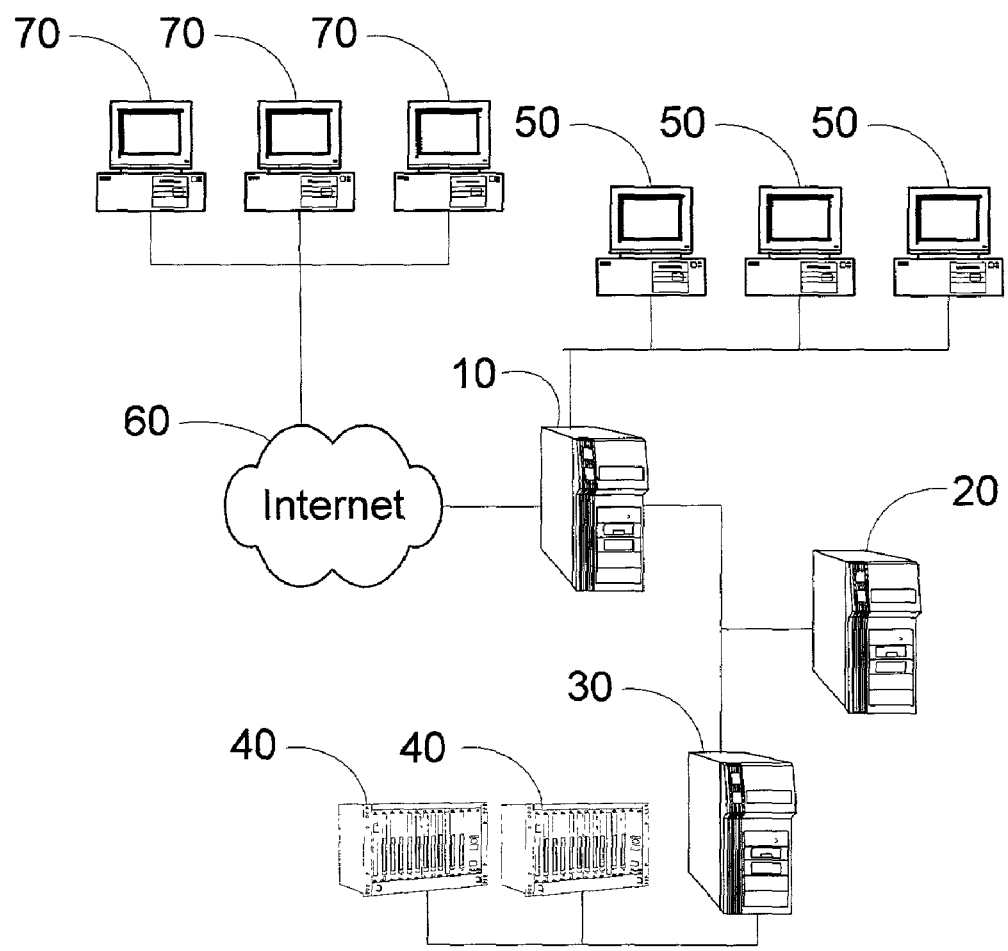
FIG. 1 is a schematic drawing depicting an exemplary process control environment for the present invention wherein a manufacturing/process control network includes a portal server that provides a variety of portal services to browser clients.

An exemplary manufacturing/process control information portal server incorporating the present invention provides session-persistent concurrent user license allocation/enforcement with regard to resources accessed by clients via the portal server site. Access to licensed portal server resources is predicated upon the existence of an available concurrent user license (i.e., the maximum number of granted concurrent user licenses has not been reached). Furthermore, a granted concurrent user license persists along with a particular user session as a user session traverses other pages via the portal server. The concurrent user license grant persists for a session until a license terminating condition is met that causes the portal server to release the session's license. Examples of session-terminating events/conditions include: a user session granted one of the licenses has not submitted a request or other session-sustaining message to the portal site server for a period of time, the user session has exceeded a maximum time period, the user session has logged off, etc.

In an embodiment of the present invention, rather than requiring grant of a license to a user session when a portal site is initially accessed (e.g., a user logs onto the site), a concurrent user license is not required, and thus not consumed, by a client of the portal server until the client seeks access, via the portal server, to a resource that requires possession of one of the concurrent user licenses. In a particular implementation of this delayed grant approach to concurrent user licensing, scripts for Web pages associated with licensed resources include a call to a "get license" function executed by a license management facility. In response to receiving a get license function call the license management facility grants (if available) a concurrent user license to the identified session with which the request is associated. The total number of currently granted user licenses is incremented (or the available number of licenses is decremented). The license management facility returns an "error code" stating that a license was granted to the identified portal server session. Also, an identification of the session that now possesses a concurrent user license is stored with a list of sessions that presently possess a concurrent user license. In this way, the license grant persists across the user session on the portal server's site.

The calling script associated with the requested portal server resource, upon receiving the license management facility's response (with error code) executes conditional operations based upon the error code. For example, if the error code indicates that a license was granted to the session, then access to the licensed resource is allowed. If the license was denied, then access to the resource is likewise denied. Of course the resource (i.e., the programmed script) ultimately decides how to process a request in view of the license management facility's returned error code.

There are many ways in which a portal server's licensed resources exercise their ultimate control over whether a client user (requester) is granted access to the protected resource. For example, certain portal server resources (Web pages) have associated scripts that conditionally execute the "get license" function call based upon parameters identifying an access request's origin. For example, the Web page scripts can bypass a get license function call when the portal server resources are accessed by particular specified "pre-licensed" applications (or "super user" classes) seeking access to the portal server (e.g., WonderWare's Licensed InTouch nodes). While other requesters require possession of a license, in the case of defined exempt requesters no additional concurrent user license is required to access portal resources.

The above-described session-based licensing scheme includes a number of attractive features. One such feature is equitable assessment of value and compensation to a software/service provider for use of the portal services. The portal server includes many resources, some resources require a license for a user to gain access, while other resources do not require a license. The portal services (or pages) that are considered of premium value to the customer and/or the software/service provider are the only ones for which the customer is expected to obtain concurrent user licenses.

Another feature, license persistence, enhances a user session experience. Because a concurrent user license, once granted, persists across the user session at the portal, users need not logon multiple times while accessing multiple resources provided by the manufacturing/process control portal site. Nor does a user, once logged on, need to be concerned that a license will be withdrawn merely because the user has left a Web page that requires a license. A user's session license is ensured to persist until explicitly released or lost through an extended period of inaction, and thus the session is unlikely to be halted due to a lack of a license once a user receives the concurrent user license.

Turning to FIG. 1, an exemplary portal server arrangement is schematically depicted. A portal server 10 provides portal services to a manufacturing/process control environment. That environment consists of a database server 20 and a data access server 30. The data access server 30 in turn connects to process control equipment 40. The portal server 10 provides its services to browser clients at locally connected workstations 50 and, via the Internet 60 or a proprietary network, at remote work stations 70.

Figure 2:
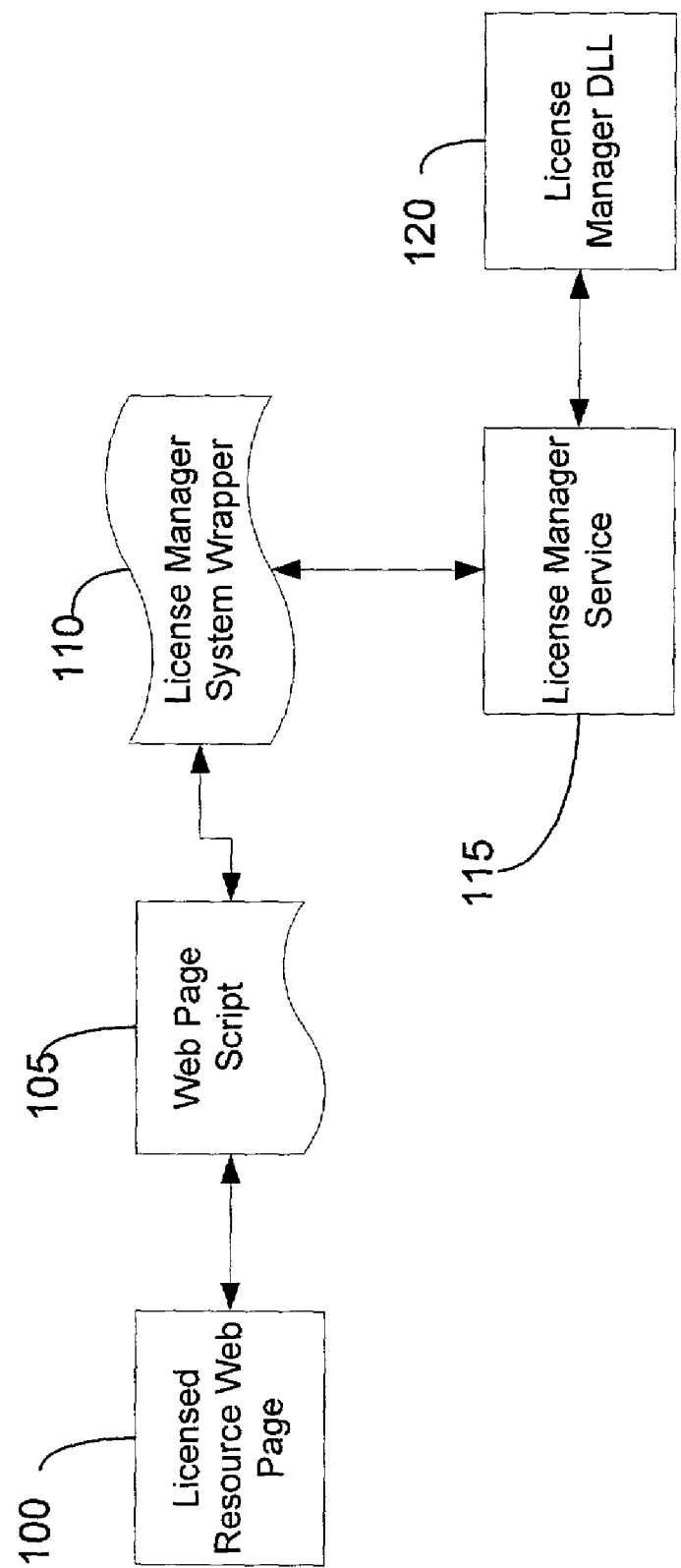
FIG. 2 is a schematic drawing summarizing the general license request passing arrangement between executed portal server page scripts and a license manager for an exemplary portal server embodying the present invention.

Turning to FIG. 2, an exemplary portal server license management implementation for the portal server 10 is illustratively depicted. A Web page 100 on the portal server 10 includes a script 105. Within the script 105 is a call to a GetLicense( ) function that is, by way of example, a VBSCRIPT/ASP function. The GetLicense( ) function invokes a LicMgrWrpr 110 COM object. In general, the LicMgrWrpr 110 provides an interface to ASP pages. The LicMgrWrpr 110 COM object calls a license manager service 115 supported by the manufacturing/process control portal server 10. The license manager service 115 provides a constantly running interface accessible to receive requests for license management services such as modifying a concurrent user license, getting a concurrent user license, and releasing a concurrent user license. The license manager service 115 calls a dynamically linked library (LicMgr.dll) 120. The LicMgr.dll 120 performs the request received by the license manager service 115. The LicMgr.dll 120, by way of example, executes requests to: read from a license definition, write to a license definition (e.g., modify a maximum concurrent user license value), grant a concurrent user license to an identified session, release a concurrent user license granted to an identified session, etc. The LicMgr.dll 120 is loaded upon startup of the license manager service 115 to avoid delays when it is called.

The above example concerns an exemplary structure for carrying out the GetLicense( ) function. However, the LicMgrWrpr 110, license manager service 115, and LicMgr.dll 120 are similarly invoked to perform any of a variety of calls to an exemplary license management system. Such calls/functions initiate releasing a previously allocated concurrent user license in response to, for example, a ReleaseLicense( ) function, requesting by an administrator summary license information based upon license use records maintained by the license management system, changing license terms (e.g., the number of installed concurrent user licenses), etc. In the case of an administrator query to display historical license usage information, a licenselog.asp page queries the use records via operations performed by the LicMgr.dll 120.

The present invention however, is not limited to the above-described implementation path. Those skilled in the art will readily appreciate the existence of a variety of arrangements for invoking and carrying out the functionality of a license management service for a portal server that embodies the present invention in view of the disclosure herein. Such other arrangements are contemplated in accordance with alternative embodiments of the present invention.

With reference to FIG. 3, the following license data is maintained and accessed by the LicMgr.dll 120 in carrying out its session-persistent concurrent user license management responsibilities. A LicInfo structure 130 contains sessionID, timecreated, and userID values for each user session possessing a concurrent user license on the manufacturing/process control system portal server. This data structure (e.g., a string) is traversed in response to each request to get or release a concurrent user license based upon an identified sessionID. An ActiveLicenses structure 132 stores a value representing the number of currently granted licenses. A TotalLicenses structure 134 stores a value containing the maximum number of licenses that can be concurrently granted to distinct sessions. The ActiveLicenses structure 132 and TotalLicenses structure 134 facilitate the license management system's decision of whether to grant an additional license. In an alternative embodiment of the invention, a single value, representing the total remaining licenses is accessed to facilitate license grant determinations. Yet another structure maintained by LicMgr.dll 120 is a license log 136. The license log 136 maintains a record of license management activity by the license manager. In an embodiment of the invention, the license log 136 adds an entry each time a license is released. Utilizing the information maintained in the ActiveLicenses structure 132, the license manager creates a log entry in the license log 136 including the userID, sessionID, start time, and end time of a grant of a released license. In alternative embodiments of the invention a more extensive set of events are registered (e.g., access denials). An exemplary set of fields for log records stored within the license log 136 are described herein below with reference to FIG. 4.

As mentioned previously herein above, the license management system maintains a log of license activity. Turning to FIG. 4, an exemplary license log record format is depicted. An ID field 140 specifies an integer value identifying the record entry in the license log. A timestart field 142 specifies a date and time at which a particular user session event commenced. In the case of allocating a concurrent license to an identified session, the timestart field 142 identifies the time at which the concurrent license was granted to an identified session. In an embodiment of the invention, the timestart field 142 can also identify when a license request was denied, or a concurrent license definition for an enterprise was modified (e.g., the maximum allowable number of concurrent licenses was updated). A timestop field 144 specifies a date and time at which a particular user session event ended. In the case of allocating a concurrent license to an identified session, the timestop field 144 identifies the time at which the concurrent license was released by an identified session. A duration value is derived from the timestart field 142 and timestop field 144 for a particular license log record.

An eventID field 146 stores a character string (or alternatively a binary code) specifying an event type for a logged event. The license log possesses the capability to store multiple types of events, and the eventID field 146 enables filtering of particular events to render an appropriate output for a system administrator.

A sessionID field 148 stores a value uniquely identifying a particular user session. As explained above, allocated concurrent user licenses persist across sessions. When a session is allocated a concurrent user license, the session ID is stored in the LicInfo structure 130 maintained by the license manager. The stored session ID in the LicInfo structure 130 enables the license manager function to identify sessions that have already acquired a concurrent license and thus avoid allocating multiple concurrent licenses to the same session. When a license grant is released, the session ID maintained in the LicInfo structure 130 is stored in the sessionID 148 of a corresponding license log entry.

A userID 150 stores the logon user name associated with the session. The userID 150 value is not used for purposes of enforcing a licensing scheme. However, the userID 150 values are displayed when an administrator submits a request to the license management system to display concurrent license allocation records.

An activecount field 152 stores a value indicating the number of concurrent licenses that were granted at the time the entry was made. A maxcount field 154 stores a value indicating the number of licenses installed (maximum allocatable concurrent licenses to sessions) for an enterprise. In the case of a license denial event, the values of the activecount field 152 and the maxcount field 154 are equal.

Turning to FIG. 5, an exemplary set of interface functions supported by the LicMgr.dll 120 is depicted. A GetLicense function 200 is a full service call to the LicMgr.dll to allocate a license to an identified requesting session (to which the license is to be assigned). Other passed parameters include a user ID (for logging), language code (for error messages), an "error" code (returned value indicating success/failure of call), and an "error" message (returned text string that is visually displayed for the user in the indicated language). An exemplary set of error/status messages applicable to the functions identified in FIG. 5 comprises: successful license grant, license unavailable, invalid/empty session ID, license already granted to session, license successfully released, license not released (due to an error such as no prior license grant). A GetLicenseEx function 202 performs the same function as the GetLicense function 200, but the GetLicenseEx function 202 does not return an error message.

A ReleaseLicense function 204 is a full service call to the LicMgr.dll to release/de-allocate a concurrent user license previously given to an identified user session. Other passed/returned parameters include a language code, an error code, and an error message. A ReleaseLicenseEx function 206 performs the same function as the ReleaseLicense function 204, but the ReleaseLicenseEx function 206 does not return an error message.

Two logging and information calls are provided to populate an administrator interface displaying session-based concurrent user license allocation information. A GetLicInfo function 208 returns a string containing the sessionID values to which concurrent licenses are presently allocated. Each string entry (per sessionID) includes: time created, sessionID, and a userID. The GetLicInfo function 208 also returns a string specifying the current number of granted (active) concurrent licenses and a string specifying the current maximum number of concurrent licenses that can be granted to sessions. When an application request generates an error, it may call the GetErrorMsg function 210 with the error code and language code as inputs and receive back the textual error message corresponding to the error.

The LicMgr.dll also includes encryption/decryption functions. These functions allow utility programs to encrypt and then save a customer's user ID and password to the registry and then later retrieve and provide decrypted values for the user ID and password. A CryptSetRegKey function 212 encrypts a passed string. Passed parameters include a registry key, a value under the registry key, and a string to be encrypted. An error code is returned. A CryptGetRegKey function 214 decrypts an identified value. Passed parameters include a registry key and a value under the registry key. A decrypted string and error cord are returned.

Figure 6A:
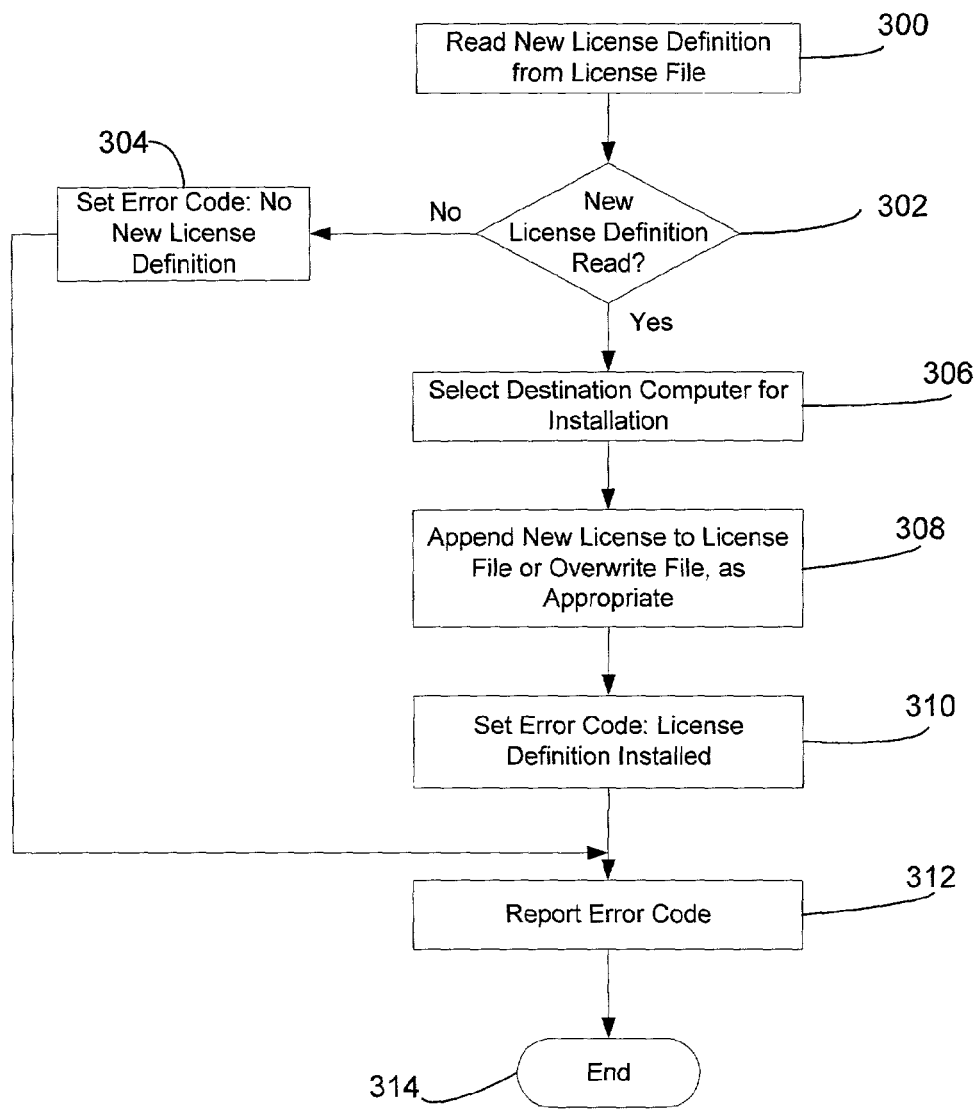
FIGS. 6A and 6B are flowcharts summarizing an exemplary two-part process for installing a new/updated license definition enforced by a concurrent user license management system.
Figure 6B:
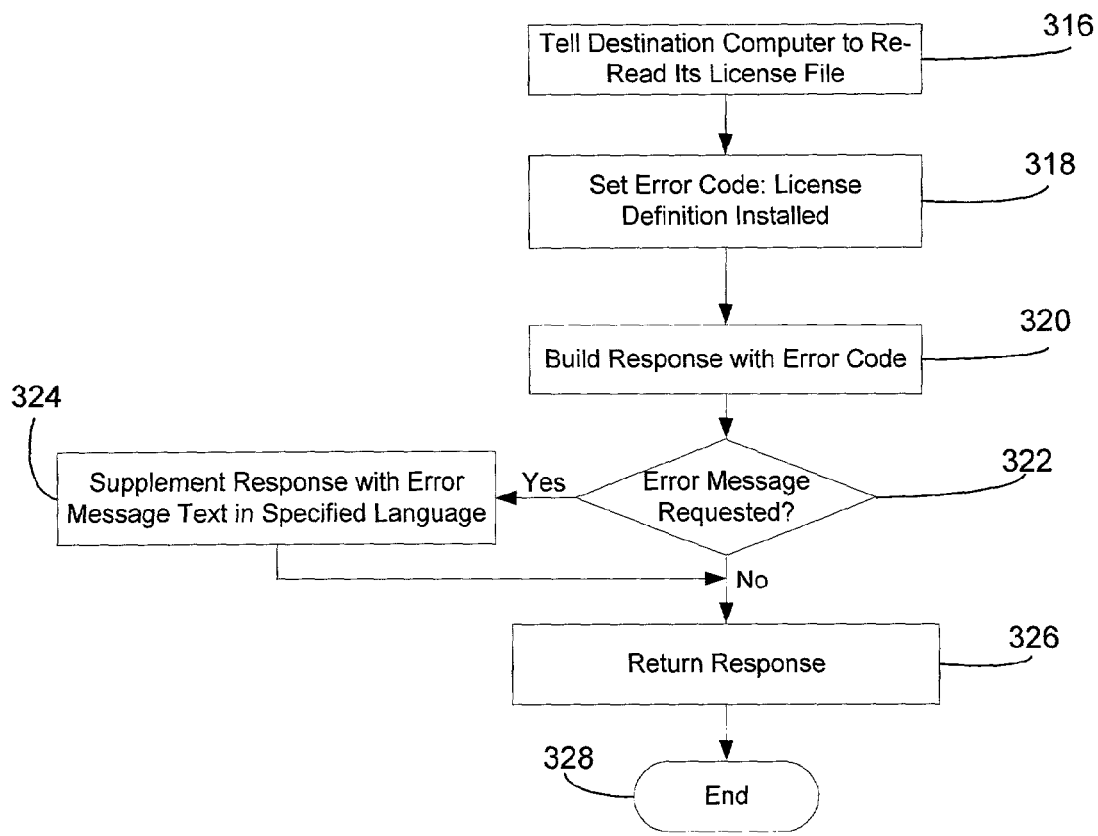

Turning to FIGS. 6A and 6B, these flowcharts depict an exemplary two-part process for installing a new/updated license definition for an enterprise. Such requests are, by way of example, submitted by a properly authenticated and authorized system administrator via an administration interface page of the manufacturing/process control portal server. Such security measures are well known to those skilled in the art and will not be addressed here.

The first part of the process updates the license definition file. During step 300 of FIG. 6A, a new license definition is read from a license file. This file may be provided, for example, on a floppy disk or on a Web site. Step 302 checks to see if the file contains a valid license definition. If not, then control passes to step 304 wherein an error code is generated indicating the failure. Control next passes to step 312 (see below). If, on the other hand, a valid new license definition is read in step 302, then control passes to step 306 wherein the destination computer that will receive the new license definition is selected. Next, in step 308, one of two possible courses of action is taken, depending upon the circumstances. Either the new license definition is appended to the existing license file on the destination computer, or the new license definition completely replaces (overwrites) that license file. An error code indicating success is set in step 310. The error code is reported in step 312 and the first part of the process ends in step 314. Note that at this point, the destination computer is not using the updated license file.

In the second part of the process, depicted in FIG. 6B, the updated license file comes into use. This part may be invoked by selecting the "Re-Read License" button shown on the screen in FIG. 9. (See that figure and the accompanying text below.) After the destination's license file is updated (appended to or overwritten), the LicMgr.dll 120 of FIG. 2 tells the destination computer in step 316 to re-read its license file. Having done so, the destination computer now operates with the updated file. In step 318, an error code is set indicating that the new license definition was successfully installed. Control then passes to step 320 in which a response is generated that includes the specified error code. Next, at step 322, if the request is of a type that a text error message is requested, then control passes to step 324 wherein the response initially built during step 320 is supplemented with error message text. The error message text is provided in a language specified in the original request to the license manager. Thereafter, control passes to step 326 wherein the previously built response is returned. Control then passes to the End 328.

Figure 7:
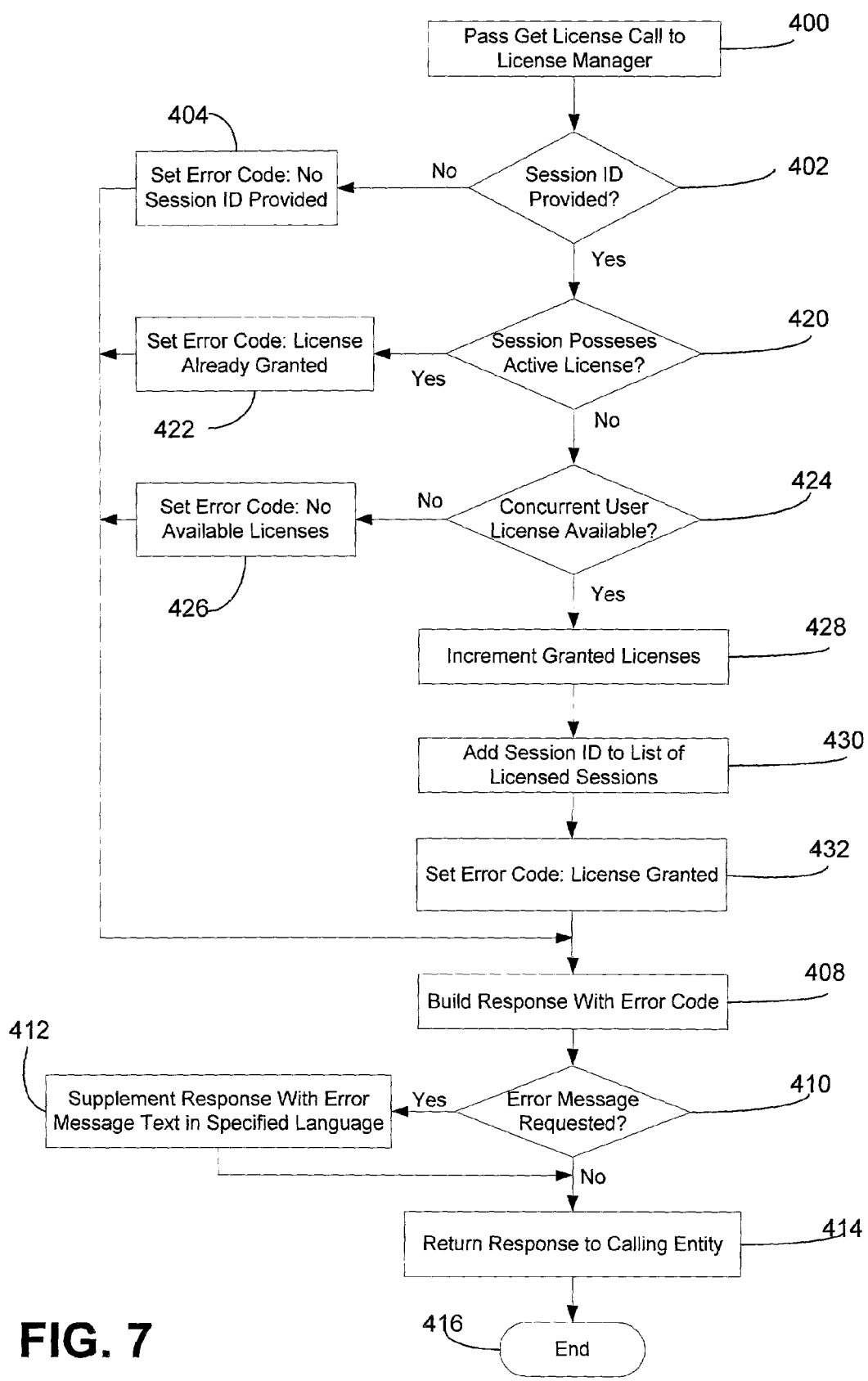
FIG. 7 is a flowchart summarizing a set of steps performed by the license management system in response to an executed get license call.

Turning to FIG. 7, a flowchart depicts a set of steps performed by the license management system in response to an executed get license call within an accessed page script executed by the portal server when a user accesses a portal-provided resource that requires an active user license. The GetLicense (or abbreviated GetLicenseEx) call is, by way of example, associated with user-client requests to view certain data-bound Web pages. In general, the LicMgr.dll determines whether a user session identified in the request already has received a concurrent user license. If the user session does not have such a license, then the license manager determines whether such a license is available. If the maximum licensed user count has not been reached for concurrent users, then the license manager allocates one of the available concurrent user licenses to the session.

It is noted that in the exemplary embodiment of the invention, the license manager is a supplementary service that facilitates management of concurrent user licenses. The license manager accepts or denies a license request based upon the session ID and the availability of a concurrent user license, and provides a corresponding response/error code. It is up to the "calling" executed page script to determine how to handle the returned error code and either allow or deny the user-client's request to access the resources associated with the Web page. This division of responsibility between accessed Web page scripts and the license manager enables programming of Web page access to manufacturing/process control data resources in a highly customized manner. For example, a particular script is programmed to conditionally exempt user session requests from particular applications or identified users/groups from a concurrent user license requirement. In such instances, the get license call within the Web page's associated script is conditionally bypassed for this particular set of "super users."

Referring to the steps summarized in FIG. 7, during step 400, a get license call is passed via the program architecture depicted in FIG. 2 to the license manager 120. Such a call is, by way of example, embedded within a Web page for which an active concurrent user license is required. A get license call includes at least a session ID. A user name is passed as well (for purposes of event logging). A language code is also supported to facilitate generation of error messages according to supported local languages.

In an embodiment of the invention, session ID values are used to track granted concurrent user licenses. Therefore, the license manager is unable to make license grant determinations without a session ID being furnished. At step 402, the request is examined to ensure that a session ID is included. If a session ID is not specified, then control passes to step 404 wherein an error code is generated indicating that no session ID was present. Control then passes to step 408, and a response is generated that includes the specified error code (in this case the "no session ID" code). Next, at step 410 if the request is of a type that a text error message is requested, then control passes to step 412 wherein the response initially built during step 408 is supplemented with error message text. The error message text is provided in a language specified in the original request to the license manager. Thereafter, control passes to step 414 wherein the license manager returns the previously built response to the caller. Control then passes to the End 416. As noted above with reference to FIG. 5, the get license function call also has a short version that does not request error text. In that case, control passes from step 410 directly to step 414 (the error message insertion step is bypassed).

Returning to step 402, if a session ID is provided in the get license function call, then control passes to step 420. As mentioned previously above, allocated concurrent user licenses persist over a user session (subject potentially to loss due to a period of inaction by a user) with the portal server. Therefore, when a user accesses a license-restricted resource via the portal the session may already possess an allocated license. To ensure that a same session does not unnecessarily consume multiple licenses, during step 420 the submitted session ID is compared to the session ID values in the LicInfo structure 130. If the session ID is located in the LicInfo structure 130, then the identified session already possesses a concurrent user license, and control passes to step 422 wherein an error code is generated indicating that the session already possesses a license. Control then passes to step 408 where, as mentioned above, a response is built according to a provided error code.

If at step 420, the session ID is not found in the LicInfo structure 130, then control passes to step 424. At step 424 the license manager determines whether a concurrent user license is available. Such a determination is made, for example, by comparing the current number of allocated (active) concurrent user licenses stored in the ActiveLicenses structure 132 to a maximum allowable number of concurrent licenses stored in the TotalLicenses structure 134. If the comparison indicates that all of the available licenses have been allocated to other sessions, then control passes to step 426 wherein the license manager generates an error code indicating that no licenses are available to grant. Control then passes to step 408. If, at step 424, licenses are available, then control passes to step 428 wherein the value stored in the ActiveLicenses structure 132 is incremented to reflect granting of a concurrent user license. Next, the sessionID, userID, and start time are added to the LicInfo structure 130 during step 430. Thereafter, during step 432 an error code is set for a response indicating that a license was successfully granted to the identified session. Control then passes to step 408.

Figure 8:
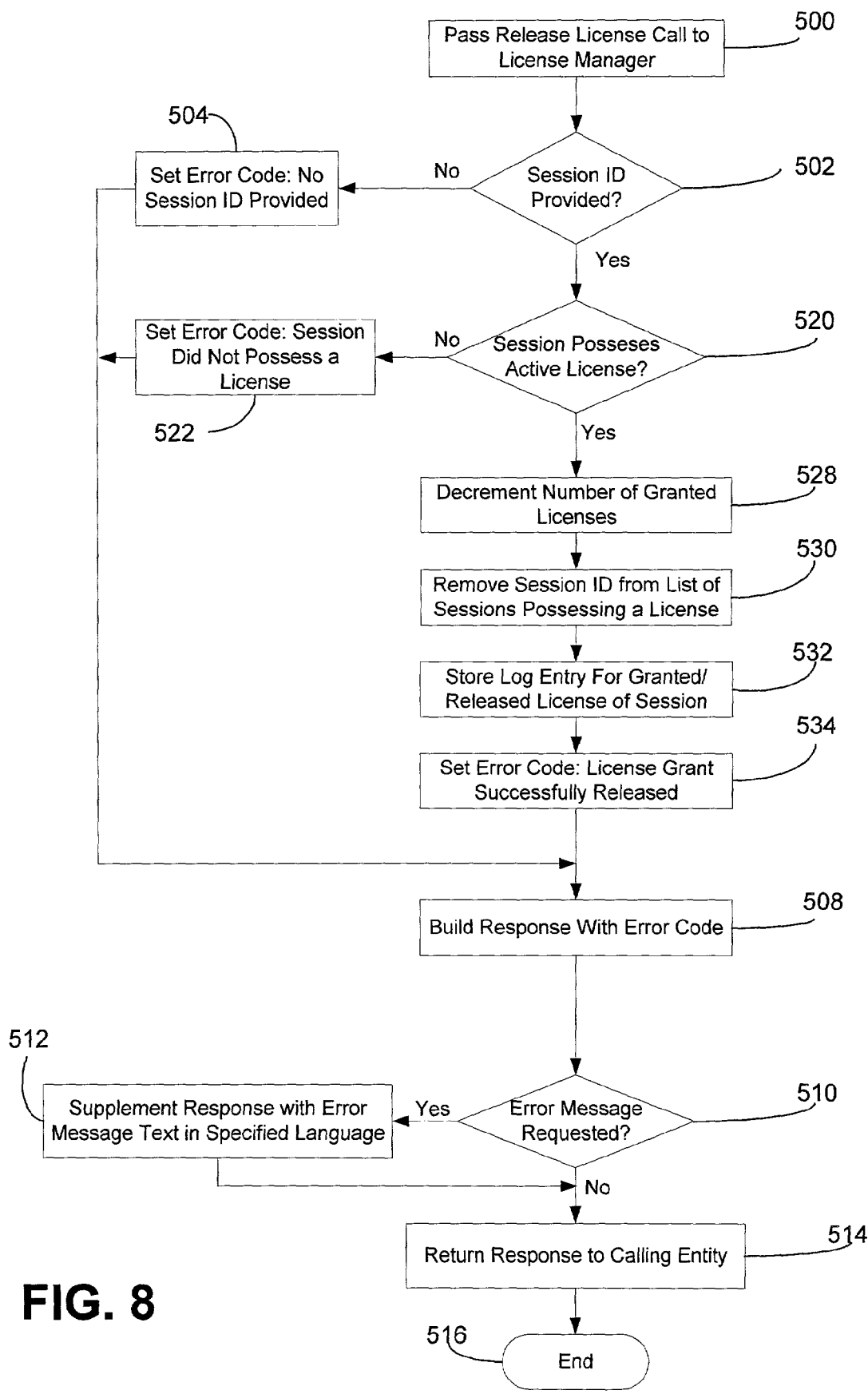
FIG. 8 is a flowchart summarizing a set of steps performed by the license management system in response to a release license call.

Turning to FIG. 8, a flowchart depicts a set of steps performed by the license management system in response to a release license call from the portal server when a license previously granted to an identified session is released. The ReleaseLicense (or abbreviated ReleaseLicenseEx) call is, by way of example, associated with termination of a user-client session at the portal server site (either through an explicit user action or alternatively inaction at the portal server site). In general, the LicMgr.dll determines whether a user session identified in the request already has received a concurrent user license. If the user session does have such a license, then the license manager releases the license, updates its licensing status variables, and logs the user session license grant/release in the license log 136.

Referring to the steps summarized in FIG. 8, during step 500, a release license call is passed via the program architecture depicted in FIG. 2 to the license manager dll 120. Such a call, by way of example, arises from a user logging off the portal site (or a section thereof) or by the portal server timing out the user session due to inaction. A release license call includes at least a session ID. A language code is also supported to facilitate generation of error messages according to supported local languages.

In an embodiment of the invention, session ID values are used to track granted concurrent user licenses. Therefore, the license manager is unable to release a license without a furnished session ID. At step 502, the release call is examined to ensure that a session ID is included. If a session ID is not specified, then control passes to step 504 wherein an error code is generated indicating that no session ID was present. Control then passes to step 508, and a response is generated that includes the specified error code (in this case the "no session ID" code). Next, at step 510 if the request is of a type that a text error message is requested, then control passes to step 512 wherein the response initially built during step 508 is supplemented with error message text. The error message text is provided in a language specified in the original release license function call to the license manager. Thereafter, control passes to step 514 wherein the license manager returns the previously built response to the caller. Control then passes to the End 516. As noted above with reference to FIG. 5, the release license function call also has a short version that does not request error text. In that case, control passes from step 510 directly to step 514 (the error message insertion step is bypassed).

Returning to step 502, if a session ID is provided in the release license function call, then control passes to step 520. During step 520 the submitted session ID is compared to the session ID values in the LicInfo structure 130. If the session ID is not located in the LicInfo structure 130, then the identified session does not possess a concurrent user license (and therefore cannot release a license). Control therefore passes to step 522 wherein an error code is generated indicating that the session did not possess a license at the time the release request was processed. Control then passes to step 508 where, as mentioned above, a response is built according to a provided error code.

If at step 520, the session ID is found in the LicInfo structure 130, then control passes to step 528. At step 528 the license manager decrements the number of granted licenses stored in the ActiveLicenses structure 132 to reflect releasing the concurrent user license from the identified session. Next, the sessionID, userID, and start time are deleted from the LicInfo structure 130 during step 530. Next, during step 532 a log entry including the start time, stop time, userID, and sessionID is added to the license log 136. Thereafter, during step 534 an error code is set for a response indicating that a license was successfully released for the identified session. Control then passes to step 508.

Having described a set of exemplary steps for maintaining concurrent user licenses with reference to FIGS. 7 and 8, it is emphasized that the above steps comprise an exemplary methodology for managing distribution of a set of session-persistent concurrent user licenses. Those skilled in the art will readily appreciate the breadth of alternative methodologies for carrying out the present invention. For example, the choices of error conditions/codes and the subsequent handling of those events (including logging) can be handled in a variety of manners in accordance with various embodiments of the present invention.

Figure 9:
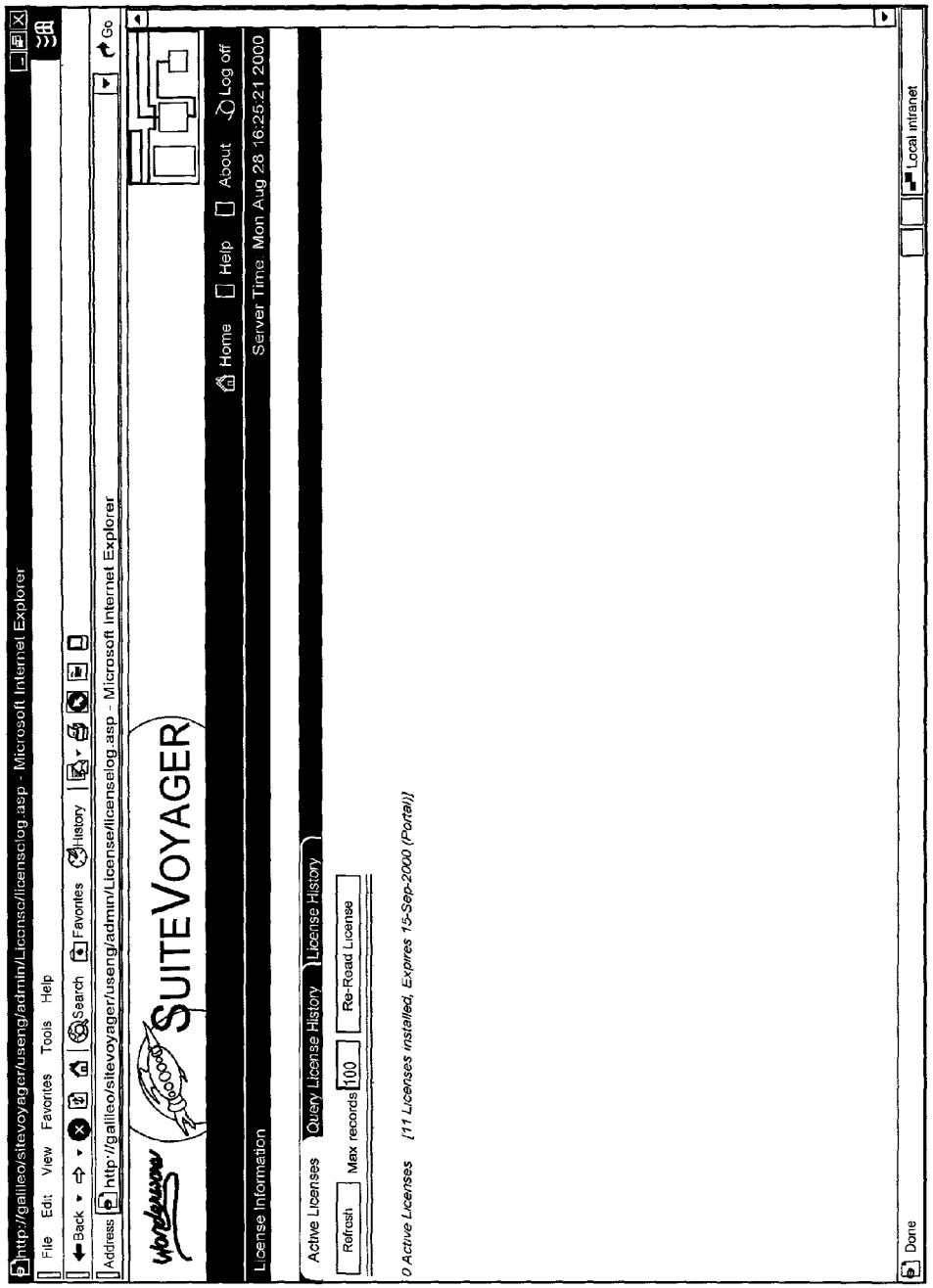
FIG. 9 is an illustrative administrative graphical user interface depicting a list of current active concurrent user licenses and their associated user information.
Figure 10:
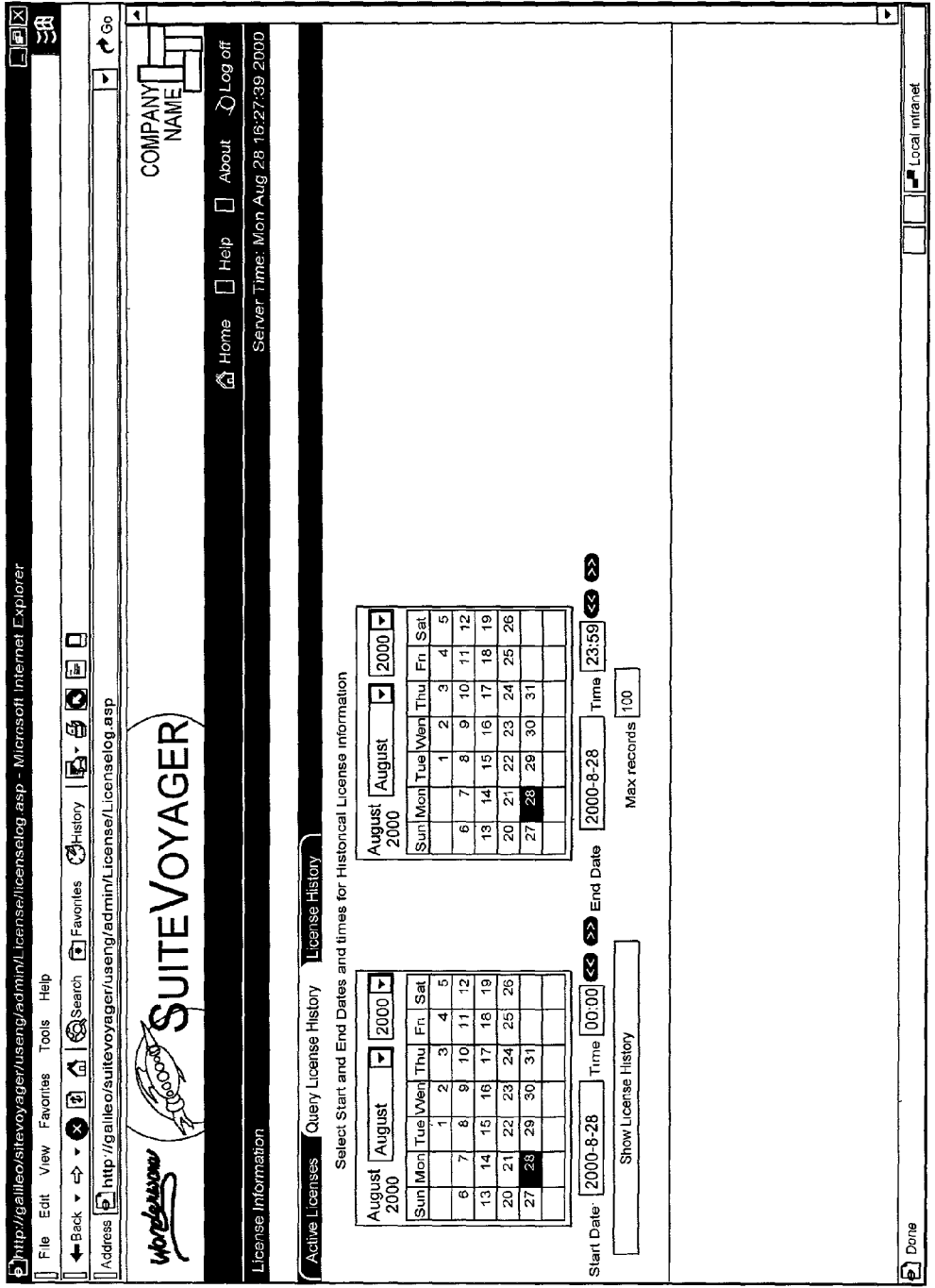
FIG. 10 is an illustrative graphical user interface displaying a query interface enabling an administrator to submit a query of a set of license records within the license log.
Figure 11:
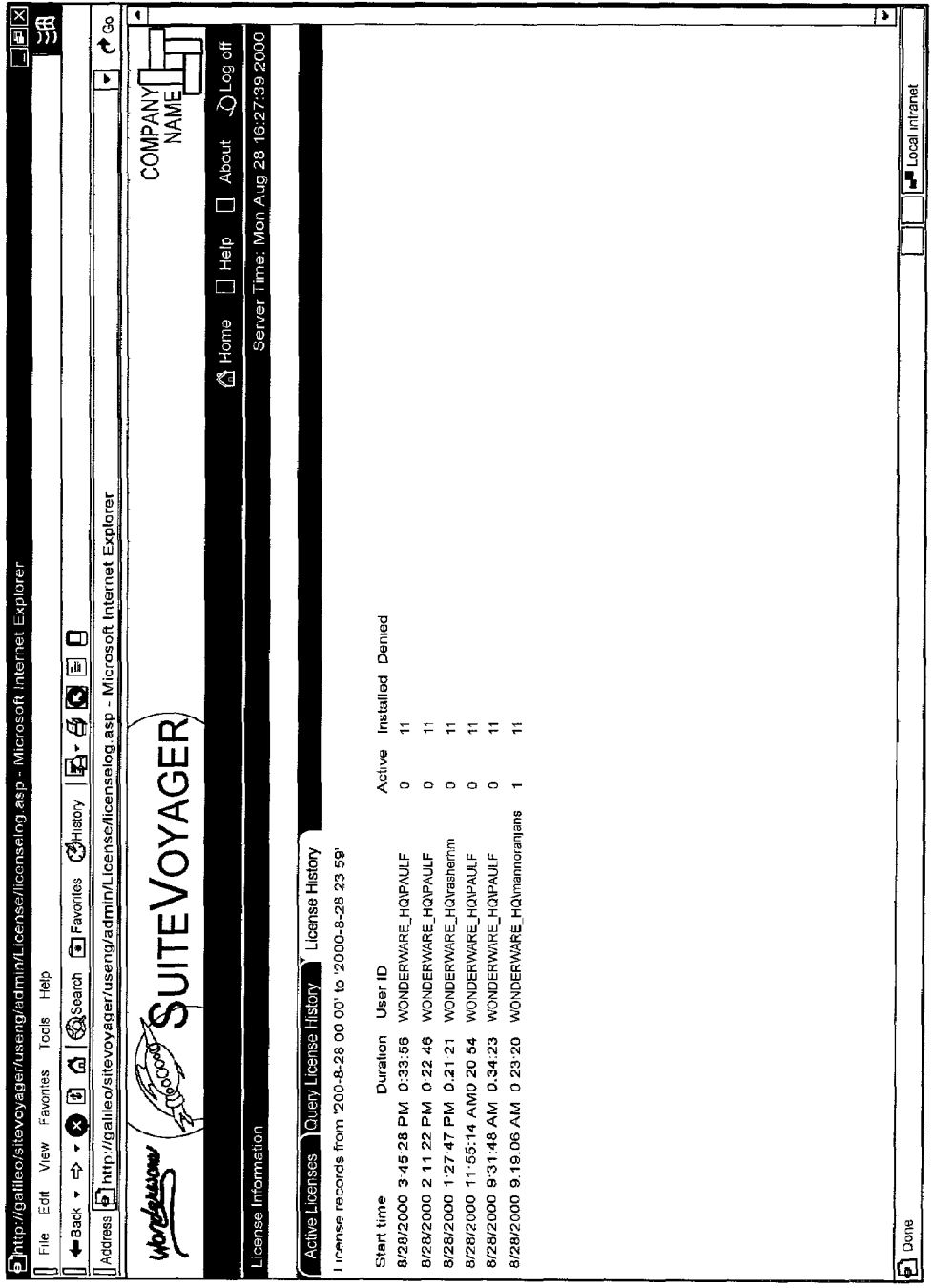
FIG. 11 is an illustrative administrative graphical user interface depicting concurrent user license record information over a specified time period.

A license management system includes monitoring features that record user session information. The user session information includes, for example: user identities, time of access, duration, number of currently licenses active, maximum allocated licenses during session, and denials of access due to insufficient installed licenses. The license management system will also provide aggregate system license information for an enterprise such as allocated concurrent user licenses at any point in time, total licenses installed (maximum concurrent license users). Such information is stored in a searchable database such as an SQL database. The database utility accepts search queries and responds by displaying relevant retrieved records and particular values. With reference to FIGS. 9, 10, and 11, exemplary displays are provided for displaying responsive license information in response to user queries.

FIG. 9 displays a list of current active concurrent user licenses and their associated user information. The license monitor interface depicted in FIG. 9 displays the current number of installed licenses (e.g., 11). Thus, the current configuration will allow up to eleven concurrent users. An expiration date for the installed licenses is also included. The monitor interface also displays the current number of allocated concurrent user licenses (zero). The interface also displays a maximum number of records the system is configured to maintain. This is the maximum number of current license allocation record entries that the system will maintain. In the present example, the maximum number of concurrent license records that are stored in a license history is 100. A "Refresh" button causes the system to delete the oldest entries of the license allocation records in the event that the records exceed 100. A "Re-Read Licenses" button, when selected, forces the system to read and apply a new license definition (without shutting down the license administration scheme).

Turning to FIG. 10, a second available monitor interface displays a query interface enabling an administrator to submit a query of a set of license records within the license log 136. The administrator defines a query according to one or more of the following: a start date, start time, end date, end time, and a maximum number of retrieved entries. In alternative embodiments of the invention, the query engine supports identifying particular users or user groups and virtually any other parameter type supported by the concurrent user license allocation records.

Turning now to FIG. 11, a license history monitor interface displays concurrent user license record information over a specified time period. A first column depicts the start time of the licensed activity for a particular session. A second column identifies the duration. A third column displays a user ID. In most of the entries in FIG. 11, the number of currently active licenses is zero because a license has been released. The manner of displaying such information can take on virtually any of a number of forms. Thus, the list depicted in FIG. 11 is merely an illustrative example of a variety of interfaces suitable for displaying license record information.

Illustrative embodiments of the present invention and certain variations thereof have been provided in the Figures and accompanying written description. The present invention is not intended to be limited to these embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A method for administering a session-based concurrent user licensing agreement on a manufacturing/process control information portal such that a single logon during a session persists across multiple distinct resources to which access is provided via a plant information portal server, the method comprising the steps:

receiving, by the plant information portal server, an access request for a resource for which a license is required;

invoking, based upon a code within a sequence of commands associated with the requested resource, a license manager associated with restricted resources associated with the plant information portal server, the license manager performing, for the purpose of granting, if needed, one of potentially multiple available session-based concurrent licenses, a set further steps including:
  first confirming that an identified source associated with the request needs a concurrent license;
  second confirming that a concurrent license is available to assign to the identified source; and
  adding the identified source to a list of session-based concurrent license users to which a session-based concurrent license is assigned.

2. The method of claim 1 wherein the second confirming step is based upon a maximum number of allowed concurrently licensed sessions under an established concurrent license agreement maintained by the license manager.

3. The method of claim 1 wherein the invoking step is performed in response to an attempt by a particular identified user-session to access portal resources via a web page provided by the portal server.

4. The method of claim 1 wherein the first confirming step comprises determining that the identified source does not currently possess one of the session-based concurrent licenses.

5. The method of claim 4 wherein the first confirming step is carried out by comparing the identified source of the request with the list of session-based concurrent license users.

6. The method of claim 1 further comprising the steps of:
  allocating a session-based concurrent license to the identified source; and
  adjusting a concurrent license counter value in accordance with the assigning step.

7. The method of claim 1 wherein an allocated session-based concurrent license grant, as a result of the adding step, persists across requests from the identified source spanning multiple distinct resources accessed via the plant information portal server.

8. The method of claim 1 further comprising the license manager returning an indication of whether a session-based concurrent license has been granted to the identified source of the request.

9. The method of claim 8 further comprising the steps of:
  receiving, by an entity that initiated a License request call to the license manager during the invoking step, the indication; and
  determining, based upon the received indication, whether to grant the access request.

10. The method of claim 1 wherein the sequence of commands include a conditional test for invoking the license manager.

11. The method of claim 10 wherein the conditional test relates to an origin of the access request.

12. The method of claim 1 further comprising, maintaining access via the portal server to a set of resources, wherein the invoking step is implemented with regard to the set of resources on an individual resource basis.

13. The method of claim 1 further comprising persisting a previous session-based concurrent license grant when a requestor exits a resource associated with an initial grant of the session-based concurrent license.

14. The method of claim 1 wherein the code within a sequence of commands associated with the requested resource comprises a function call for invoking a service with which the license manager is associated.

15. The method of claim 1 further comprising maintaining a historical record of concurrent license usage information.

16. The method of claim 15 further comprising displaying the concurrent license usage information via a query results interface.

17. Computer-readable media including computer executable instructions for facilitating administering a session-based concurrent user licensing agreement on a manufacturing/process control information portal such that a single logon during a session persists across multiple distinct resources to which access is provided via a plant information portal server, the computer executable instructions facilitating performing the steps of:
  receiving, byte plant information portal server, an access request for a resource for which a license is required;
  invoking, based upon a code within a sequence of commands associated with the requested resource, a license manager associated with restricted resources associated with the plant information portal server, the license manager performing, for the purpose of granting, if needed, one of potentially multiple available session-based concurrent licenses, a set of further steps including:
    first confirming that an identified source associated with the request needs a concurrent license;
    second confirming that a concurrent license is available to assign to the identified source; and
    adding the identified source to a list of session-based concurrent license users to which a session-based concurrent license is assigned.

18. The computer-readable medium of claim 17 wherein the first confirming step comprises determining that the identified source does not currently possess one of the session-based concurrent licenses.

19. The computer-readable medium of claim 17 further comprising computer-executable instructions facilitating the license manager returning an indication of whether a session-based concurrent license has been granted to the identified source of the request.

20. The computer-readable medium of claim 17 further comprising computer-executable instructions facilitating maintaining a historical record of concurrent license usage information.

* * * * *

UNITED STATES PATENT AND TRADEMARK OFFICE
CERTIFICATE OF CORRECTION

PATENT NO.        : 7,647,407 B2
APPLICATION NO.   : 09/954509
DATED             : January 12, 2010
INVENTOR(S)       : Omshehe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1876 days.

Signed and Sealed this

Sixteenth Day of November, 2010

David J. Kappos
*Director of the United States Patent and Trademark Office*